United States Patent
Unverdorben et al.

(10) Patent No.: US 6,436,182 B1
(45) Date of Patent: Aug. 20, 2002

(54) PROCESS FOR PRODUCING HIGHLY CONCENTRATED PIGMENT PRESSCAKES

(75) Inventors: Leonhard Unverdorben, Nidderau; Uwe Nickel, Bad Homburg; Andreas Harz, Waghaeusel; Gunnar Tilch, Mainz, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/612,470

(22) Filed: Jul. 7, 2000

(30) Foreign Application Priority Data

Jul. 7, 1999 (DE) .......................................... 199 31 322

(51) Int. Cl.⁷ .............................................. B01D 37/02
(52) U.S. Cl. ..................... 106/412; 106/493; 106/494; 106/495; 106/496; 106/497; 106/498
(58) Field of Search ................................ 106/412, 493, 106/494, 495, 496, 497, 498

(56) References Cited

U.S. PATENT DOCUMENTS

| | | | |
|---|---|---|---|
| 3,528,365 A | | 9/1970 | List et al. ................... 100/37 |
| 3,968,742 A | | 7/1976 | Kerr .......................... 100/37 |
| 4,036,652 A | * | 7/1977 | Rothmayer ................ 524/190 |
| 4,589,922 A | * | 5/1986 | Donegan ................... 106/413 |
| 4,615,868 A | | 10/1986 | Wong et al. ................ 422/111 |
| 4,702,116 A | | 10/1987 | Gawol et al. .............. 73/865.6 |
| 4,759,801 A | * | 7/1988 | Goldmann et al. ........ 106/499 |
| 4,762,523 A | | 8/1988 | Gawol et al. ................ 8/524 |
| 4,785,082 A | | 11/1988 | Weide et al. ............... 534/887 |
| 4,828,622 A | | 5/1989 | Weide et al. ............... 534/887 |
| 5,021,090 A | * | 6/1991 | Schwartz et al. .......... 524/190 |
| 5,336,314 A | * | 8/1994 | Lamers ...................... 106/506 |
| 5,667,580 A | * | 9/1997 | Babler ....................... 106/499 |

FOREIGN PATENT DOCUMENTS

| | | |
|---|---|---|
| DE | 25 33 229 | 2/1976 |
| DE | 196 32 964 | 8/1996 |
| EP | 0 144 940 | 6/1985 |
| EP | 0 180 870 | 5/1986 |
| EP | 0 181 545 | 5/1986 |
| EP | 0 505 870 | 9/1992 |
| GB | 2 043 609 | 10/1980 |
| WO | WO 98/06561 | 2/1998 |

OTHER PUBLICATIONS

EPO Search Report (Oct. 27, 2000).
Derwent Patent Family Abstract for WO 98/06561 (Feb. 19, 1998).
Derwent Patent Family Abstract for EP 0 505 870 (Sep. 30, 1992).
Derwent Patent Family Abstract for DE 196 32 964 (Aug. 16, 1996).

* cited by examiner

Primary Examiner—Anthony Green
(74) Attorney, Agent, or Firm—Susan S. Jackson; Scott E. Hanf

(57) ABSTRACT

The invention relates to an advantageous process for producing highly concentrated pigment presscakes which comprises concentrating a pigment suspension on a high-pressure filter press with a pressure of at least 16 bar to a pigment content of at least 50% by weight without adding nonionic surfactants which have a cloud point in water.

10 Claims, No Drawings

PROCESS FOR PRODUCING HIGHLY CONCENTRATED PIGMENT PRESSCAKES

BACKGROUND OF THE INVENTION

The present invention relates to a process for producing highly concentrated pigment presscakes from which concentrated pigment preparations can be prepared.

Pigment preparations are used to pigment natural and synthetic materials, such as paints, printing inks, plastics, electrophotographic toners, (powder) coating materials, ink-jet inks, color filters, and seed.

One method of preparing such preparations is the flush process, where an aqueous pigment cake is dispersed by means of phase change of the pigments as a consequence of a relatively high affinity of the pigment surface for organic liquids. Phase separation and removal of the residual water with kneading under reduced pressure gives preparations with a low water content.

A different procedure for preparing concentrated pigment preparations starts from powder pigments, which are incorporated together with dispersing auxiliaries into water or organic liquids using a disperser apparatus. Following their synthesis, in which they are obtained predominantly in aqueous systems, the pigments are dried and ground to a pigment powder.

In order for the preparation to contain finely divided pigment particles which are easily wetted with the dispersing medium, the dry pigment powder, which is normally in the form of agglomerates, must be disrupted with high energy input and an extensive duration of dispersion and incorporated into the desired medium in order to ensure sufficient color strength, particularity, and gloss.

In order to prepare pigment preparations having pigment contents of more than 35% by weight of pigment directly from pigment presscakes, the pigment content in the presscake must be more than 50% by weight, preferably more than 55% by weight. Since the low particle size of organic color pigments means that they are usually difficult to filter, they are usually isolated from the mother liquor, following their synthesis, on filter presses of large surface area. This is usually done using membrane filter presses operating with pressures of up to 10 bar. Pigment presscakes from a membrane filter press usually contain not more than from 20 to 40% by weight of pigment and are unsuitable for preparing concentrated pigment preparations. The addition of certain filtration assistant additives, such as the surfactants described in EP-A-0 180 870, for example, allows the pigment content of the presscake to be increased, since the additives employed raise the degree of dewatering by causing agglomeration of the pigment particles. However, these additives are usually a disruptive factor in the dispersion subsequently required for preparing pigment preparations, or in the application medium in which the preparation is to be used.

SUMMARY OF THE INVENTION

It is therefore an object of the present invention to develop a process for producing highly concentrated pigment presscakes which overcomes the above-described disadvantages and, in a simple manner, provides pigment presscakes having a pigment content of more than 50% by weight.

In addition, the pigment presscakes produced in this way ought to be readily dispersible in aqueous or organic media in order to allow pigment preparations to be prepared therefrom in an economically advantageous manner.

It has been found that this object can be achieved by the use of a high-pressure filter press without the addition of filtration assistant additives.

DESCRIPTION OF THE PREFERRED EMBODIMENTS

The invention provides a process for producing highly concentrated pigment presscakes, which comprises concentrating a pigment suspension on a high-pressure filter press with a pressure of at least 16 bar to a pigment content of at least 50% by weight without adding nonionic surfactants which have a cloud point in water.

A suitable example of a high-pressure filter press is a filter press comprising a number of serially disposed pressing elements which are formed as hollow cylinders and comprise a spacing cylinder and two press plates arranged at either end of the spacing cylinder, a pressing chamber between each pair of adjacent pressing elements, one cylindrical displacement ring per pressing chamber, with which the pressing chamber can be closed and opened, having in each case one annular seal at both ends of the pressing elements and means for the hydraulic drive of the pressing elements in the direction of their serial disposition. A filter press of this kind is described in DE-CI-196 32 964. In order to comply with the object of the invention, the filter press must be operated with a pressure of at least 16 bar, preferably at least 20 bar. Pressures of from 20 to 120 bar, preferably from 50 to 110 bar, are judicious.

Suitable pigments are preferably organic pigments, especially azo pigments or polycyclic pigments, such as, for example, quinacridones, dioxazines, phthalocyanines, perylenes, perinones, diketopyrrolopyrroles, anthanthrones and thioindigo pigments, or functionalized pigments, such as charge control agents. The pigment suspension used can have a pigment content of from 5 to 40% by weight, preferably from 7 to 30% by weight, based on the overall weight of the pigment suspension. The medium of the pigment suspension can be aqueous, aqueous-organic or organic. Examples of suitable organic media are $C_1$–$C_6$ alcohols, chlorinated benzenes, $C_3$–$C_6$-ketones, such as methyl ethyl ketone, $C_1$–$C_6$ carboxylic acid $C_1$–$C_4$ alkyl esters, such as ethyl acetate, xylenes, toluene, acetic acid, and also dipolar aprotic solvents, such as dimethylformamide or N-methylpyrrolidone, for example.

Preference, however, is given to aqueous pigment suspensions and to the aqueous pigment presscakes produced from them. The pigment suspension may further include auxiliaries used in the pigment synthesis, such as resin soaps, for example, which do not substantially affect the filtration process.

The process of the invention can be carried out at temperatures from 0 to 100° C., judiciously from 20 to 80° C.

Depending on the pressure of the filter press and the nature of the pigment it is possible to achieve a presscake pigment content of up to 75% by weight. In general, pigment contents of 55 to 70% by weight are achieved.

These high pigment contents are, surprisingly, achieved even without the use of filtration assistant additives, such as the nonionic surfactants described in EP-A-0 180 870 which have a cloud point in water.

By dispersing them in aqueous, aqueous-organic or organic carrier material, e.g., in resin dispersions or in glycols, the pigment presscakes produced in accordance with the invention can be processed further to concentrated pigment preparations in which the pigment concentration is generally between 20 and 55% by weight, preferably between 30 and 50% by weight. In comparison with the dispersing of the corresponding powder pigment it has surprisingly been found that when using the presscakes produced in accordance with the invention the dispersion time required is shortened by up to 70% for a given level of energy input. The dispersion time required is the time necessary to achieve a defined level of color strength in the pigment preparation.

Aqueous, aqueous-organic or organic pigment presscakes, especially aqueous presscakes of pigments from the classes of the azo pigments, quinacridones, dioxazines, phthalocyanines, perylenes, perinones, diketopyrrolopyrroles, anthanthrones and thioindigo pigments having a pigment content of more than 55% by weight, for example from 55 to 75% by weight, in particular from 60 to 70% by weight, which are free from filtration assistant additives, such as nonionic surfactants, for example, are novel and are likewise provided by the present invention. A suitable organic medium is the medium present in the pigment suspension used, as described above.

The pigment presscakes of the invention and the pigment preparations produced from them can be used to pigment natural and synthetic materials, such as, for example, paints, printing inks, plastics, electrophotographic toners, (powder) coating materials, ink-jet inks, color filters, electret materials, and seed. Suitable ink-jet inks are those with an aqueous or solvent-containing base, or hot-melt inks. Suitable electrophotographic toners include those based on blending technology (extrusion, kneading) and polymerization toners. Particularly suitable plastics are the polymers suitable for producing masterbatches.

EXAMPLES

Example 1

A pigment suspension containing 13.3% by weight of C.I. Pigment Yellow 16 was filtered at a throughput of 112 kg of dry matter/m$^2$h at 110 bar in a high-pressure filter press as described in DE-C1-196 32 964 which was equipped with polypropylene filter material. The pigment presscake obtained by this means contained 69.5% by weight of Pigment Yellow 16.

The pigment presscake from Example 1 was dispersed in a 70:20:10 water/glycol/dispersing auxiliary system in a laboratory beadmill, a color strength of 100% being obtained after a dispersing time of 15 minutes.

Comparative Example

A comparable amount of powder pigment C.I. Pigment Yellow 16 was dispersed in the same way, and the same color strength was not achieved until after a dispersing time of 46 minutes, despite the fact that the pigment content in both preparations, calculated on the basis of 100% pigment, was identical.

Example 2

A pigment suspension containing 15.7% by weight of C.I. Pigment Yellow 83 was filtered in the same way as in Example 1. With the resulting presscake, which contained 59.8% by weight of pigment, the dispersing time (medium as in Example 1) was shortened by 48% relative to the corresponding powder product.

Example 3

The pigments listed in the table below were concentrated in the same way as in Example 1:

| Pigment | Pigment content in suspension supplied | Filtration pressure | Pigment content of the presscake |
| --- | --- | --- | --- |
| P. Y. 1 | 15.9% by weight | 110 bar | 67.4% by weight |
| P. Y. 97 | 11.8% by weight | 110 bar | 71.4% by weight |
| P. Y. 3 | 17.9% by weight | 110 bar | 67.7% by weight |
| P. Y. 154 | 14.8% by weight | 110 bar | 66.4% by weight |
|  | 7.6% by weight | 110 bar | 65.6% by weight |
|  | 14.4% by weight | 20 bar | 56.7% by weight |
| P. R. 112 | 15.5% by weight | 110 bar | 58.4% by weight |
| P. V. 23 | 27% by weight | 110 bar | 64.1% by weight |
| P. O. 36 | 39.9% by weight | 100 bar | 71% by weight |
| P. R. 170 | 32.4% by weight | 100 bar | 69.8% by weight |
| P. Y. 151 | 35.6% by weight | 100 bar | 64.8% by weight |

What is claimed is:

1. A process for producing a highly concentrated pigment presscake, which comprises concentrating a pigment suspension comprised of a pigment and a medium on a high-pressure filter press with a pressure of at least 16 bar to a pigment content of at least 50% by weight without adding nonionic surfactants which have a cloud point in water.

2. The process as claimed in claim 1, wherein the pressure of the high-pressure filter press is from 20 to 120 bar.

3. The process as claimed in claim 1, wherein the pigment is an organic pigment.

4. The process as claimed in claim 1, wherein the pigment is an azo pigment or a polycyclic pigment.

5. The process as claimed in claim 4, wherein the polycyclic pigment is a quinacridone, dioxazine, phthalocyanine, perylene, perinone, diketopyrrolopyrrole, anthanthrone or thioindigo pigment.

6. The process as claimed in claim 1, wherein the pigment suspension used has a pigment content of from 5 to 40% by weight, based on the overall weight of the pigment suspension.

7. The process as claimed in claim 1, wherein the pigment suspension used has a pigment content of from 7 to 30% by weight, based on the overall weight of the pigment suspension.

8. The process as claimed in claim 1, wherein the pigment suspension is concentrated to a pigment content of from 50 to 75% by weight of pigment, based on the overall weight of the pigment presscake.

9. The process as claimed in claim 1, wherein the medium of the pigment suspension and of the pigment presscake is water.

10. The process as claimed in claim 1, wherein the medium of the pigment suspension and of the pigment presscake is a $C_1$–$C_6$ alcohol, chlorinated benzenes, $C_3$–$C_6$ ketones, $C_1$–$C_6$ carboxylic acid $C_1$–$C_4$ alkyl esters, xylenes, toluene, acetic acid, or a dipolar aprotic solvent.

* * * * *